US010289838B2

United States Patent
Singla et al.

(10) Patent No.: US 10,289,838 B2
(45) Date of Patent: May 14, 2019

(54) SCORING FOR THREAT OBSERVABLES (71) Applicant: HEWLETT PACKARD ENTERPRISE DEVELOPMENT LP, Houston, TX (US)

(72) Inventors: Anurag Singla, Sunnyvale, CA (US); Tomas Sander, Princeton, NJ (US); Edward Ross, Austin, TX (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 147 days.

(21) Appl. No.: 15/116,847

(22) PCT Filed: Feb. 21, 2014

(86) PCT No.: PCT/US2014/017613
§ 371 (c)(1),
(2) Date: Aug. 5, 2016

(87) PCT Pub. No.: WO2015/126410
PCT Pub. Date: Aug. 27, 2015

(65) Prior Publication Data
US 2016/0378978 A1 Dec. 29, 2016

(51) Int. Cl.
*H04L 29/06* (2006.01)
*G06F 21/55* (2013.01)
*G06F 21/57* (2013.01)

(52) U.S. Cl.
CPC .......... *G06F 21/55* (2013.01); *G06F 21/554* (2013.01); *G06F 21/577* (2013.01); *H04L 63/1433* (2013.01); *G06F 2221/034* (2013.01); *G06F 2221/2101* (2013.01)

(58) Field of Classification Search
CPC ...... G06F 21/554; G06F 21/577; G06F 21/55; H04L 63/1433
USPC ........................................................ 726/23
See application file for complete search history.

(56) References Cited

U.S. PATENT DOCUMENTS

| 7,854,007 | B2 | 12/2010 | Sprosts et al. |
| 8,108,910 | B2 | 1/2012 | Conner et al. |
| 8,214,497 | B2 | 7/2012 | Alperovitch et al. |
| 8,484,730 | B1 | 7/2013 | P. R. |
| 8,566,262 | B2 | 10/2013 | Deyo |

(Continued)

FOREIGN PATENT DOCUMENTS

WO  WO-2012/164336 A1  12/2012

OTHER PUBLICATIONS

European Patent Office, Extended European Search Report for Appl. No. 14883284.3 dated Jun. 16, 2017 (7 pages).

(Continued)

*Primary Examiner* — David J Pearson (57) ABSTRACT

Example embodiments disclosed herein relate to determining threat scores for threat observables. Information about multiple threat observables are received from providing entities. The information about the threat observables include at least one attribute about a respective threat associated with the threat observable. Threat scores are determined for the respective threat observables for multiple entities. In one example, a first score of a first one of the threat observables is determined and is different than a second score of the first threat observable for a second entity based on a treatment of the attribute(s).

20 Claims, 4 Drawing Sheets

(56) References Cited

U.S. PATENT DOCUMENTS

| | | | |
|---|---|---|---|
| 8,595,282 B2 | 11/2013 | Nachenberg | |
| 9,319,420 B1* | 4/2016 | Franke | H04L 63/1416 |
| 2003/0093514 A1 | 5/2003 | Valdes et al. | |
| 2006/0075504 A1* | 4/2006 | Liu | G06F 11/2294 |
| | | | 726/25 |
| 2007/0143851 A1* | 6/2007 | Nicodemus | G06F 21/55 |
| | | | 726/25 |
| 2009/0328209 A1 | 12/2009 | Nachenberg | |
| 2012/0096558 A1* | 4/2012 | Evrard | G06F 21/577 |
| | | | 726/25 |
| 2012/0102568 A1* | 4/2012 | Tarbotton | G06F 21/552 |
| | | | 726/23 |
| 2012/0159619 A1* | 6/2012 | Berg | G06F 21/577 |
| | | | 726/22 |
| 2012/0185945 A1* | 7/2012 | Andres | G06F 21/56 |
| | | | 726/25 |
| 2012/0233698 A1* | 9/2012 | Watters | G06F 21/554 |
| | | | 726/25 |
| 2013/0125239 A1 | 5/2013 | McHugh et al. | |
| 2013/0191919 A1* | 7/2013 | Basavapatna | G06F 21/577 |
| | | | 726/25 |
| 2013/0227697 A1* | 8/2013 | Zandani | H04L 63/1433 |
| | | | 726/25 |
| 2013/0275355 A1 | 10/2013 | Miltonberger | |
| 2014/0007238 A1* | 1/2014 | Magee | G06F 21/577 |
| | | | 726/24 |
| 2015/0161398 A1* | 6/2015 | De Cristofaro | G06F 21/60 |
| | | | 726/26 |

OTHER PUBLICATIONS

"OWASP Risk Rating Methodology," Oct. 18, 2013, pp. 1-8, Available at: <owasp.org/index.php/OWASP_Risk_Rating_Methodology>.

International Search Report and Written Opinion, International Application No. PCT/US2014/017613, dated Nov. 17, 2014, pp. 1-10, KIPO.

* cited by examiner

SCORING FOR THREAT OBSERVABLES

BACKGROUND

Entities can maintain internal networks with one or more connections to the Internet. Internal networks include a plurality of resources connected by communication links, and can be used to connect people, provide services—both internally and externally via the Internet—and/or organize information, among other activities associated with an entity. Resources on the network can be susceptible to security attacks that originate either within the internal network or on the Internet. A security attack can include an attempt to destroy, modify, disable, steal, and/or gain unauthorized access to use of an asset (e.g., a resource, data, and information).

BRIEF DESCRIPTION OF THE DRAWINGS

The following detailed description references the drawings, wherein.

DETAILED DESCRIPTION

Entities can maintain internal networks with one or more connections to the Internet. Internal networks include a plurality of resources connected by communication links, and can be used to connect people, provide services—both internally and externally via the Internet—and/or organize information, among other activities associated with an entity. Resources on the network can be susceptible to security attacks that originate either within the internal network or on the Internet. A security attack can include an attempt to destroy, modify, disable, steal, and/or gain unauthorized access to use of an asset (e.g., a resource, data, and information).

Entities can seek to avoid security attacks by identifying vulnerabilities in their networks. A vulnerability can include a flaw and/or weakness in the network's design, implementation, operation, and/or management that could be exploited to violate the network's security policy (e.g., a circumstance and/or event with the potential to adversely impact a network through unauthorized access, destruction, disclosure, and/or modification of an asset of the entity). An exploit can include computer-readable instructions, data, and/or a sequence of commands that takes advantage of a vulnerability to cause unwanted and/or unanticipated behavior. A security attack can include a use and/or attempted use of an exploit against a vulnerability. To avoid subsequent security attacks, an entity can perform an investigation (e.g., forensic investigation) to determine what exploits were used against what vulnerabilities during the security attack.

It can be beneficial for an entity to identify current security threats to a network associated with the entity, to information held by the entity, and/or to resources managed by the entity (e.g., computing devices, memory resources, processing resources). A security threat can include information that indicates the possibility of an impending security attack. The information can include information indicating a vulnerability and/or exploit, and/or information that an attack has occurred to another entity, among other information.

Entities face increasingly sophisticated, professional, organized, and well-funded security attacks on their information technology (IT) infrastructures. By quickly and accurately detecting, identifying, and/or addressing security threats, an entity may mitigate the effects of these security attacks. However, entities may find it increasingly difficult to quickly and accurately detect, identify, and/or address these security threat alerts on their own. Entities may currently identify security threat alerts by accessing a plurality of threat intelligence sources. The threat intelligence sources can, however, provide a vast amount of information and can result in a flood of security threats. The security threats can lead to false positive security alerts that may take human resources to analyze and resolve. Encouraging entities to share information relating to security threats may improve the speed and/or accuracy in detecting emerging threats.

Entities can participate in a threat exchange community to identify security threats. For instance, a threat exchange community can include a group of computing systems that exchange information (e.g., data) related to information technology infrastructures (e.g., systems and services) via communication links. The computing systems can be referred to as participants of the threat exchange community. In some implementations, entities including and/or controlling the computing systems can also be referred to as participants of the threat exchange community.

However, as noted, some security threats that may be relevant to certain participants may not be relevant to other participants. For example, if a threat intelligence feed assigns reputation score to threat observables (e.g. Internet Protocol (IP) Addresses, Domains, File Hashes etc.), but it is the same value that is provided to all the subscribers of the service, some subscribers may find the value useful, while others may find the value to be a false positive or irrelevant. A threat observable is information that can be observed by a device that can be used to make a determination that something (e.g., an event, an action, an IP address, a device, a set of events, a pattern, etc.) is malicious.

An IP address may not be equally malicious for all the subscribers. In one example, an attack originating from an IP address as part of a political campaign may have higher malicious reputation score for government organizations as compared to financial institutions. In another example, if an IP address is exploiting a vulnerability in a specific version of an operating system, such as, WINDOWS, and an organization that has only Linux servers as critical servers available for access externally, the malicious reputation score of this IP address should be very low for this organization.

Accordingly, various embodiments disclosed herein relate to providing customized reputation scores of threat observables to entities such as organizations, persons, departments, teams, partnerships, corporations, companies, etc. Knowing the vulnerabilities that an entity has in its external facing Asset Model can affect the reputation score of an IP address causing an external attack. Further, the customized reputation scores are based on policies of entities providing information so that the customizations can be based on rules associated with the providing members.

Outbound communication to malicious IP addresses can vary in severity based on the type of threats that organization usually observes in their network and can reduce or alleviate reputation score of a specific threat observable. The reputation score may also vary by the sector or vertical of the organization(s) that reported a specific IP address as malicious. In certain cases, reputation score of a particular threat observable may be so low for a particular entity that the entity may not need to receive the data or worry about it. As such, in certain examples, a reputation score for the threat observable may not be sent to that particular entity.

The reputation score of each threat observable may be different for each organization or entity that receives this information. It can depend on multitude of parameters as described herein. A threat intelligence feed can utilize information received from observing entities to calculate a unique malicious reputation score for each threat observable based upon the entity receiving this information.

As noted, policy based sharing can be used in calculation of malicious reputation scores of threat observables. This is complementary to specialized malicious reputation score per entity and can also be used independently.

In the following scenario, the policy is applied to the calculation of specialized malicious reputation score for organizations. If an entity A would like to share their data only with entity B, and specific threat observables are shared, which entity C does not have access to, entity C will not know about that threat observable. But, there may be multiple other entities who share the same threat observable (e.g. IP Address) with entity C, providing access to this data to entity C. In some examples, the reliability of entity A's determination may not be used in the reputation calculated for entity C. As such, the reputation score of a threat observable for organization C can exclude the influence from entity A based on policy.

Further, other types of threat intelligence information can be provided in such a manner in addition to a malicious reputation score. For example, a score may be developed for the confidence that a particular pattern or set of events is malicious. In certain embodiments, a threat score is a value that can be calculated for a threat observable that represents the likelihood that if the threat observable is observed, a malicious behavior is associated. In the case of a reputation of an IP address or domain name, the existence of communication from the IP address or domain name may lead to the likelihood of maliciousness. As noted, the threat score can be customized for an entity. As such, relevancy of the threat observable to the particular entity can be used in determining the threat score.

Figure 1:
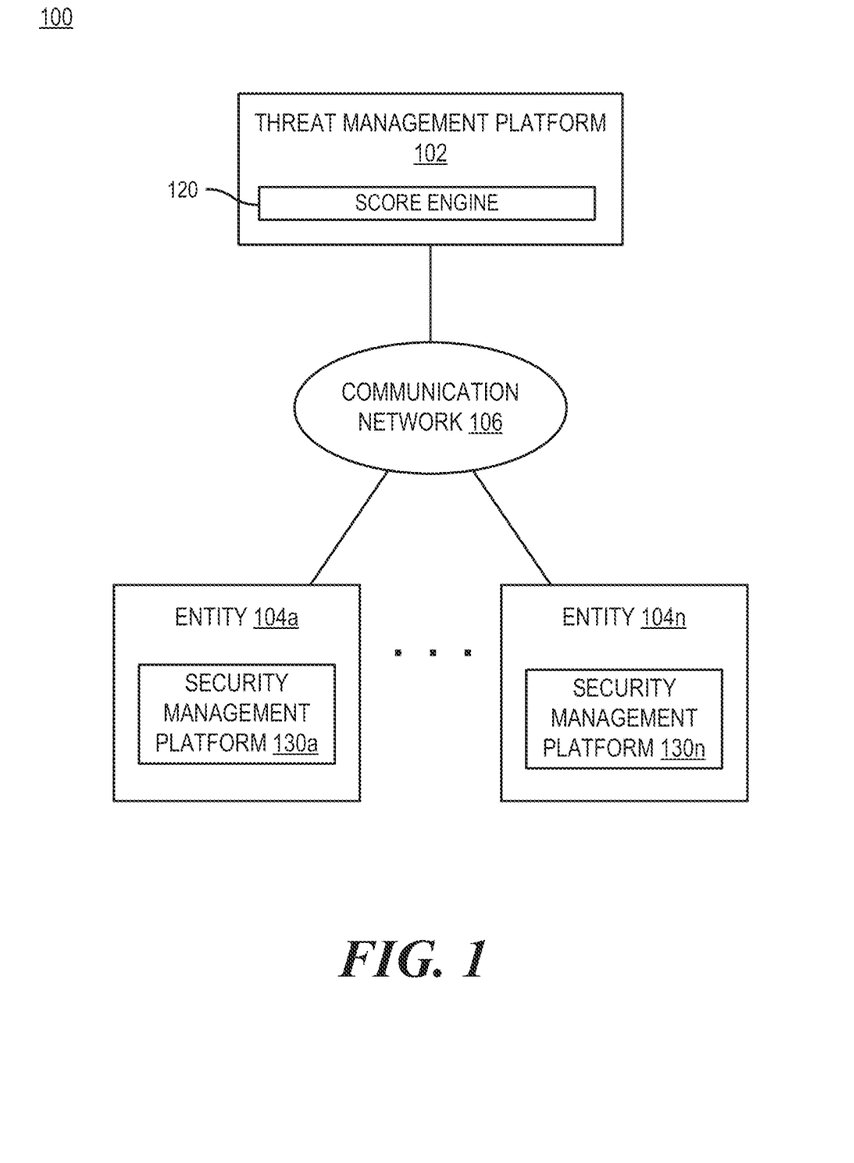
FIG. 1 is a block diagram of a system capable of score reputations of threat observables, according to one example.

FIG. 1 is a block diagram of a system capable of score reputations of threat observables, according to one example. The system 100 can include a threat management platform 102 that communicates with entities 104a-104n via a communication network 106. In certain examples, the threat management platform 102 and/or the entities 104a-104n can include a score engine 120 or security management platforms 130a-130n that are implemented using computing devices, such as servers, client computers, desktop computers, workstations, security appliances, security information and event management platforms, etc. In some embodiments, the security management platforms 130 can include special purpose machines. The score engine 120 and security management platforms 130 can respectively be implemented via a processing element, memory, and/or other components.

As described herein, the entities 104 can be considered participants in a threat exchange community. Participants include a participant server or group of participant security management platform 130 within the IT infrastructure of each entity from a group of entities. Each participant security management platform 130 (or each group of participant servers) can provide information related to actions within or at the IT infrastructure including that participant security management platform 130 to the threat management platform 102.

The threat management platform 102 can analyze information provided by each participant security management platform 130 to identify security occurrences within the threat exchange community, and provide customized scores related to the threat observables to entities 104.

In some examples, the threat observables can be based on a security occurrence. A security occurrence, as used herein, can include variables and information (e.g., data) that influence an action by the security management platforms 130. For example, such security occurrences that influence an action can include information describing a security context, a security attack, a security threat, a suspicious event, a vulnerability, an exploit, an alert, an incident, and/or other relevant events, identified using the participant provided information. Information can be correlated into scores for particular threat observables and can be customized to the particular security management platforms 130 of the respective entities 104. Examples of security management platforms 130 include an intrusion detection system, an intrusion prevention system, a security information and event management system, a firewall and the like.

Further, in various examples of the present disclosure, participants can be grouped into a plurality of clusters. The plurality of clusters can be dynamically formed based on participant provided characteristic data (e.g., infrastructure, size, industry), security data (e.g., host names, IP addresses, patch levels), and/or common security occurrence patterns identified (e.g., common security attacks, events, and incidents identified between participants). The clusters can be used to calculate threat relevancy scores for participants within the threat exchange community.

The threat exchange community may also be a private community. Private communities are those communities that threat exchange participants manage by selecting specific entities that are allowed to participate. A threat exchange participant can be a member of one or more private communities in addition to other types of communities. In some examples, indicators and threat data shared within a private community is not shared with other communities.

The plurality of entities 104a-104n can provide participant data to the threat management platform 102. The participant data can include security data and/or characteristic data.

Security data, as used herein, can include security related information (e.g., IP addresses, host names, domains, URLs, file descriptions, application signatures, patch levels, personally identifiable information, participant specific security information, etc.) For instance, security data can include information that describes security occurrences. A security occurrence, as used herein, can include variables and information (e.g., data) that influence an action by the threat management platform. For example, such security occurrences that influence an action can include information describing a security context, a security attack, a security threat, a suspicious event, a vulnerability, an exploit, an alert, an incident, and/or other relevant events, identified using the participant provided information (e.g., the participant data). The various data involved with a security occurrence can each have an individual score. When correlating this data (including contextual data), a more precise credibility score can be derived.

Characteristic data can include data related to the participant, such as infrastructure data (e.g., operating systems used, versions of software used, known vulnerabilities associated with particular devices/software used, etc.), industry sector identification (e.g., banking, government, political, IT, etc.), and/or size of the entity, for example. In a number of examples, characteristic data can include historical security data identifying previous security occurrences identified by a participant. This can be used to determine one or more other characteristics of the participant including the credibility of data shared by that participant over time.

An event (or security event), as used herein, can include a description of something that has happened. An event may be used to describe both the thing that happened and the description of the thing that happened. For instance, an event can include information such as records within a log associated with the event. Examples of events include, "Alice logged into the machine at IP address 10.1.1.1", "The machine at IP address 192.168.10.1 transferred 4.2 gigabytes of data to the machine at IP address 8.1.34.2.", "A mail message was sent from email1 to email2 at 2:38 pm", "John Smith used his badge to open door 5 in building 3 at 8:30 pm", or "a new attack campaign has been initiated announcing a future threat". Events can contain a plurality of detailed data and may be formatted in a way that is computer readable (e.g. comma separated fields). In some examples, events do not correspond to anything obviously related to security. For instance, events can be benign.

An incident (or security incident) can be information that indicates the possibility that a security attack has occurred and/or is currently occurring. Unlike a security threat, which is about the future, an incident is about the past and present. An incident can include evidence of faulty play, an alert triggered by a system that detects malicious, suspicious or anomalous activity. Incidents can be investigated to determine if a security attack actually took place (in many cases an incident can be a false positive) and the root causes (i.e. what vulnerabilities and exploits were used).

An alert (or security alert), as used herein, can include an event that indicates the possibility of an attack. For instance, an intrusion detection system of a participant entity 104 and/or the threat management platform 102 can look for behaviors that are known to be suspicious and generate an event to that effect. Such an event (e.g., an alert) can have a priority associated with it to indicate how likely it is to be a security attack and/or how dangerous the observed behavior was.

Security context can include information that describes something about the participant (e.g., participant characteristic data), the overall threat level or score of a security occurrence, something about an individual or local threat environment, information about the global threat environment of the threat exchange community (e.g., increased activity of a particular type), and/or other useful information. Said differently, a security context describes and/or is the security-related conditions within the threat exchange community. As examples, a security context can describe or account for a security threat level within the threat exchange community, a qualitative assessment of the security attacks and/or security threats within the threat exchange community, activity and/or events within the threat exchange community, the IT infrastructure within the threat exchange community, incidents within the threat exchange community, information provided by a threat exchange server, information collected by a participant of the threat exchange community, and/or other security-related information. As a specific example, a security context can be defined by security occurrences within a threat exchange community. That is, the security context of a participant or the threat exchange community can be determined based on security occurrences identified within the threat exchange community.

The threat management platform 102 receives events, incidents, and alerts from the security management platforms 130. The detailed information may include attributes of the underlying events. These attributes can be used to link a relationship of the particular event and relevancy. The score engine 120 can determine a threat score for the respective threat observables that are customized for the individual entities based on their respective characteristic data.

In certain examples, information about each threat observable can include attributes that can be categorized. A category can be part of the characteristic data, for example, one category can be infrastructure data with subcategories of operating systems, software versions, etc. Attributes can be the particular types of operating systems, software version numbers, etc. Examples of categories (attributes) include operating systems (WINDOWS, Linux, etc.), Software frameworks (Java, .NET, versions of particular frameworks, etc.), size of the entity (micro, small, medium, large, etc.), location (country, state, etc.), field (banking sector, environmental sector, government, IT, retail, etc.), known vulnerabilities (Cross-Site Scripting, injection, etc.). Moreover, in some examples, the known vulnerabilities for a particular entity can be determined from one or more of the attributes associated with the particular entity.

In one example, characteristics of the entity 104 discovering an event associated with a threat observable can be categorized and when multiple entities 104 provide similar events. As such, the score engine 120 can determine that threats associated with the threat observable can be associated with particular attributes. Other approaches to correlating attributes can also be used. The attributes can be used to determine whether the threat observable is relevant to other entities. As such, a threat score can be determined based, at least in part, on the attributes.

In one example, if the threat observable is associated with a vulnerability in WINDOWS operating system, but the entity 104*a* runs Linux operating systems, the vulnerability may not be important or even relevant to the entity 104*a*. In this scenario, the example category can be operating systems and the example attribute of the threat observable can be Windows, while the example attribute of the entity is Linux operating systems. This is a simplified example and the particular attributes may also include versions of operating systems, etc.

As noted above, a policy can be used for determining threat scores. In certain examples, the policy can be based on one or more rules. Policy rules can be set by contract, by agreement, dynamically through information received, via preferences set by a providing entity, etc. The rules can be associated with what entities can be provided information (e.g., which entities' threat scores can be based on the provided information) provided by a particular providing entity. In some examples, the rules can be based on providing information to individual entities. For example, rule A1 for providing entity A can be set as provide to, not provide to, or another limitation, for receiving entity B. In another example, the rules can be based on providing information to particular groups. For example, rule A2 for providing entity A can be set to provide, to not provide, or another limitation, for receiving group C, D, E. Moreover, other sets of entities can be chosen, for example, rule A3 for providing entity A can be set to provide to all entities, but B or a group. Other limitations can be based on different tiers of permissions to the particular entities. For example, rule A4 for providing entity A can be set to provide information to detect a threat observable, but not only provide remedy information to particular entities. In another example, the rule can be to not provide information to other entities until a remedy to the threat is determined.

Examples of groups can include a class of entities. For example, a government providing entity may wish to join and/or provide information to the banking industry, other government entities, everyone, etc. This can be more refined as well. For example, a government providing entity may wish to allow other member entities of the same government to get full access, but not other government entities. Moreover, the tier system can be based on flags associated with particular providing entities. For example, the entity providing information about a threat observable may include a flag in threat information sent to the threat management platform 102 to choose a particular policy or policy rule. In some examples, the policy or policy rule can be embedded in the information received. In other examples, the flag can be used to select a policy rule stored for the providing entity at the threat management platform 102.

Security management platforms 130 receiving the threat scores of threat observables can perform security actions when threat observables are observed. For example, an IPS can block traffic from an attack source if the attack source based on the threat observable. In another example, brute force attacks on companies can be observed and the IP address can be provided to the threat management platform 102. The IP address can then be blocked by receiving security management platforms 130 based on algorithms particular to the respective receiving entities.

The communication network 106 can use wired communications, wireless communications, or combinations thereof. Further, the communication network 106 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 106 can be in the form of a direct network link between devices. Various communications structures and infrastructure can be utilized to implement the communication network(s).

By way of example, the security management platforms 130a-130n and threat management platform 102 communicate with each other and other components with access to the communication network 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information.

Figure 2:
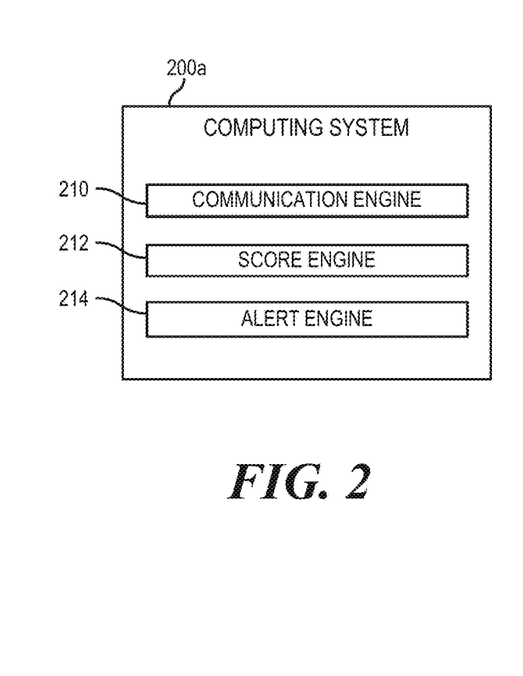
FIGS. 2 and 3 are block diagrams of computing systems capable of sending different scores of observed threat observables to different entities, according to various examples.
Figure 3:
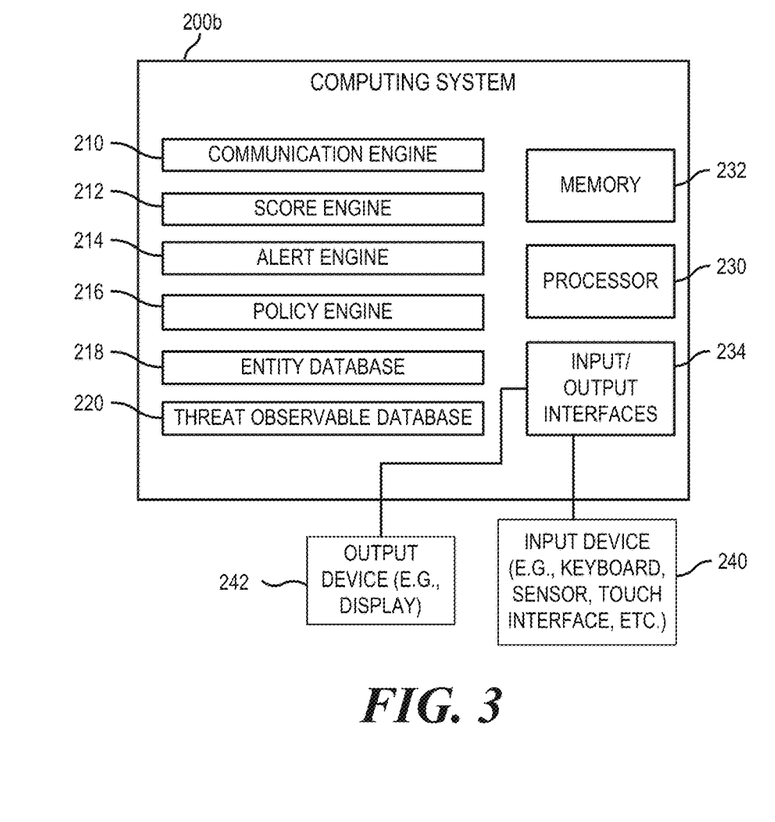

FIGS. 2 and 3 are block diagrams of computing systems capable of sending different scores of observed threat observables to different entities, according to various examples. Computing systems 200a, 200b include components that can be utilized to send different scores of observed threat observables to different entities based on threat information and policy. The respective computing systems 200a, 200b may be a notebook computer, a desktop computer, a security appliance, a server, a workstation, or any other computing device that can perform the functionality described herein. The computing system 200 can be used to implement a threat management platform 102.

The computing system 200 can include a communication engine 210 and/or module, a score engine 212 and/or module, and an alert engine 114 and/or module. Further, the computing system 200b can include a policy engine 216, an entity database 218, and a threat observable database 220. The engines 210, 212, 214, 216 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

The entity database 218 can include information about the respective entities 104a-104n (e.g., policies associated with the respective entities, characteristic data, associated categories, associated groups, associated attributes, etc.). The threat observable database 220 can include information about threat observables (e.g., events, patterns, identification tools, associated threat scores, etc.).

Security management platforms 130a-130n of entities 104a-104n can provide threat information about threat observables to the computing system 200. The communication engine 210 can receive the respective threat information about the threat observables from the entities. The threat information can include information or data about a respective threat associated with the respective threat observable. Examples of the data include how to observe the threat observable (e.g., a pattern, an IP address, a domain name, etc.), data associated with what kind of threat it is (e.g., a type of attack), data associated with what the threat is targeting, data associated with a timing of the threat, data associated with a type of vulnerability or software the threat is targeting/exploiting, data associated with a size of entity the supplying entity is and/or the size being targeted, data about a remedy to the threat, event information about a particular threat observable, etc.

A score engine 212 can determine one or more scores for the respective threat observables. In some examples, the scores are customized for particular receiving entities. As such, at least two of the scores for a threat observable can be customized to a particular receiving entity based on the respective data and a policy associated with the providing entity. The algorithms can be used to consolidate information on patterns of events and patterns detected about the respective threat observables at the providing entities.

Further, the computing system 200 may be able to construct a threat observable database 220. The database 220 can be in the form of a table containing the canonical forms of patterns that were reported. The threat observable database 220 may contain consolidated statistics or other data including entries that are associated with the canonical forms, including, for example, a total number of organizations or enterprises reporting detection of the pattern, the total number of machines or user accounts affected by the pattern of events, and a score indicating a risk or threat level of the pattern of events. The score calculated or otherwise determined from consolidated data can be used to prioritize and select patterns for analysis. The computing system 200 may also consolidate or collect shared analysis on patterns detected. Analysis may indicate whether detected patterns have been analyzed and determined to be malicious or benevolent activity. Analysis may also indicate solutions or actions to be taken in response to detecting patterns. This analysis can be provided by the score engine 212 to determine threat scores for the threat observables. Further, the analysis and scoring can take into account the relevancy of the possible threat to the receiving respective entity.

In one example, the score engine 212 can calculate the threat score based, at least in part on a relevancy component. The relevancy component, as used herein, can include a score identifying a relevancy of the security occurrence to the particular entity (e.g., how likely the participant is to experience the security occurrence, the impact such a score might have on the participant, or the ranking of a security occurrence in terms of relevancy with respect to other security occurrences that might affect the participant, whether the entity can combat the possible security occurrence, and/or a combination thereof). The threat relevancy can be related to a particular security occurrence. In some examples, a threat relevancy component can include a probability. For instance, a threat relevancy component can include a statistical probability that a security occurrence (e.g., a security attack) is relevant to the entity. A security occurrence can be associated with a participant if the participant has a verified security attack and/or is experiencing suspicious behaviors and/or events, for example.

For instance, the collected participant data used to calculate the threat relevancy component can include a subset of the total collected participant data. The subset can include participant data collected from the participant and participants within a grouping of similar characteristics (e.g., sharing a particular attribute or set of attributes, etc.).

The threat relevancy component can be calculated, for instance, by comparing the participant to a group of similar participants. As an example, the group may have a verified security attack. If the participant belongs (e.g., is grouped in) to the group with the verified security attack, the relevancy can be higher and the threat score for that entity can therefore indicate more likelihood of a threat. Moreover, the threat score can be calculated to be a binary value, an integer, a floating number, or other representation.

Calculating the threat relevancy component for each entity can include a variety of techniques to measure the similarity of participating entities. As an example, the score engine 212 can compare incoming security data from the participants to a group of participants with a verified security attack. Similarities can include similar events from an intrusion detection system (IDS), database access anomalies, and/or correlated IP addresses, size of entity, devices on the respective networks, etc.

The threat relevancy may also be calculated by the historical credibility of past submission from a participant. In other words, participants submissions are tracked over time for accuracy. The more active and accurate participants would be given a higher credibility rating which will influence the score of their submissions.

In some examples, calculating the threat relevancy component for participants can include statistically modeling a security occurrence at each participant and calculating the conditional probability of encountering a specific event (e.g., probability that a particular participant will be attacked by an exploit against a vulnerability). The incoming security data provided to the computing system 200 can be compared with participant provided characteristic data (e.g., data in the entity database 218) and/or with other threat intelligence data (e.g., data in the threat observable database 220).

Although the present example illustrates calculating a probability, calculating a threat relevancy in accordance with examples of the present disclosures is not so limited. A threat relevancy component can be calculated in situations when such a probability is not known. For instance, calculating a threat relevancy component, in various examples, can include identifying (e.g., determining) a relevancy of a security occurrence to a participant based on participant data. The relevancy, in various examples, can include a general likelihood that the participant will experience a security occurrence, its impact on the participant, or its ranking with respect to other security occurrences, and/or a combination thereof.

In various examples, calculating the threat score can include considering security context to identify a threat level (e.g., a severity of the security occurrence). For example, security context can include information that describes something about the entity, a threat, a threat actor(s), actor's motivations, actor techniques, tactics, procedures, the overall threat level of a security occurrence, information about the global threat environment of the threat exchange community (e.g., increased activity of a particular type), and/or other useful information. Comparing the characteristic data with incoming security data and/or security context can be used to determine how critical a security occurrence is to an entity receiving a customized score. For instance, depending on hardware and/or computer-readable instruction components used by the entity, a security occurrence may be of greater concern to particular entities.

The computing system can also use an alert engine 214 to provide customized threat scores to receiving entities. The alert engine 214 can categorize alert levels based on the respective threat scores. In some examples, the threat score can include numerical score (e.g., 0 to 1) and/or a generic level. A generic level can include predetermined classifications such as "high", "medium", and "low", and/or "red", "yellow, "green", among other classifications. The classifications can include predetermined classifications set by the threat exchange community and/or by an entity. The alerts can also be customized (e.g., based on one or more thresholds). For example, if a customized threat score reaches a threshold level, the threat score is sent, via the communication engine 210, to the respective entity. As such the alert engine 214 can cause sending of the alert to respective entities based on the respective score. Further, the alert engine 214 may not send an alert and threat score for one entity based on its respective score, but send the threat score for a second entity based on its respective score.

In some examples, the information used to determine the threat score customization can include an operating system of the custom entity, an industry type associated with the customized entity, a size associated with the customized entity, a machine type (e.g., server types, network security machine types, etc.) associated with the customized entity, and a storage type (e.g., servers used for storage, database vulnerabilities associated with the storage devices used, etc.) associated with the customized entity.

In one example, the threat score algorithms can take into account the frequency and/or confirmation of a threat observable from multiple entities. Further, certain entities can be ranked as providing more reliable data and can be weighted more in an algorithm used to generate the threat score. In the example, the first detection of the threat observable may generate a low threat score, while corroboration from a second entity can add to the confidence that the threat observable can be considered a threat. Further, additional occurrences and/or a frequency of the threat observable can be used. As noted herein, policies can be used to determine what information is used in generating threat scores for particular entities.

A processor 230, such as a central processing unit (CPU) or a microprocessor suitable for retrieval and execution of instructions and/or electronic circuits can be configured to perform the functionality of any of the engines 210, 212, 214, 216 or modules described herein. In certain scenarios, instructions and/or other information, such as entity information and threat observable information, can be included in memory 232 or other memory. Input/output interfaces 234 may additionally be provided by the computing system 200b. For example, input devices 240, such as a keyboard, a sensor, a touch interface, a mouse, a microphone, etc. can be utilized to receive input from an environment surrounding the computing system 200b. Further, an output device 242, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces 234.

Each of the modules (not shown) may include, for example, hardware devices including electronic circuitry for implementing the functionality described herein. In addition or as an alternative, each module may be implemented as a series of instructions encoded on a machine-readable storage medium of computing system 200 and executable by processor 230. It should be noted that, in some embodiments, some modules are implemented as hardware devices, while other modules are implemented as executable instructions.

Figure 4:
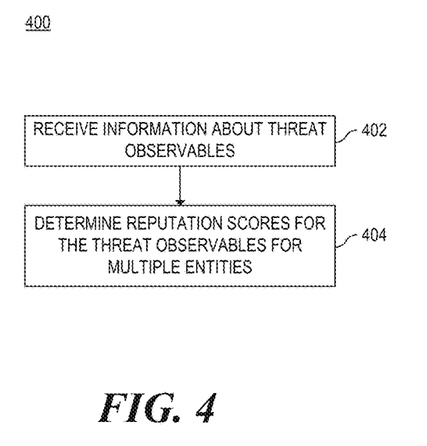
FIG. 4 is a flowchart of a method for determining reputation scores for threat observables for multiple entities, according to one example.

FIG. 4 is a flowchart of a method for determining reputation scores for threat observables for multiple entities, according to one example. Although execution of method 400 is described below with reference to computing system 200, other suitable components for execution of method 400 can be utilized (e.g., threat management platform 102). Additionally, the components for executing the method 400 may be spread among multiple devices. Method 400 may be implemented in the form of executable instructions stored on a machine-readable storage medium, such as storage medium 620, and/or in the form of electronic circuitry.

The communication engine 210 of the computing system 200 receives information about multiple threat observables from multiple providing entities (402). The threat observables can respectively include one or more attribute about a threat associated with the threat observable.

At 404, the score engine 212 determines threat scores for the respective threat observables for multiple entities. These entities can be considered entities receiving the threat scores. As such, a first score can be determined for a first entity according to a first algorithm. A second score can be determined for a second entity according to a second algorithm. The scores can be different. The difference can be because of differences in the algorithms. Moreover, the difference can be based on how the algorithm treats the attribute(s). In one example, the attribute can be used to weight a threat score. In another example, the attribute can be used to filter out whether the threat score would be relevant.

In certain cases, the use of the attribute can be based on whether a group associated with the entity includes the attribute. For example, the group can be associated with a category such as an operating system, an industry type, a size of the entity or organization, a machine type (e.g., security appliances, switches, servers, etc.), storage types, etc. In the example of the operating system category, the group can include the operating systems and/or operating system versions used by the entity. The attributes can be considered the particular operating systems/versions. As such, if a threat observable has attributes that are not included in the group associated with the receiving entity, then the algorithm can use that in weighting/filtering/scoring. As such, the treatment of the second score can be based on the algorithm being performed by the score engine 212 on the information associated with the threat observable. As noted above, the algorithms can also use additional information about the threat observables incoming from other providing entities. This information may be used to reevaluate whether a particular threat observable is related to the particular receiving entity (e.g., if another attribute becomes associated with the threat observable).

Further, an alert can be sent to one of the entities, e.g., the first entity, based on the first score. Moreover, in a similar manner, a decision can be made not to send the second entity the alert based on the second score. In some examples, when an alert is sent, the customized threat score can be provided.

Figure 5:
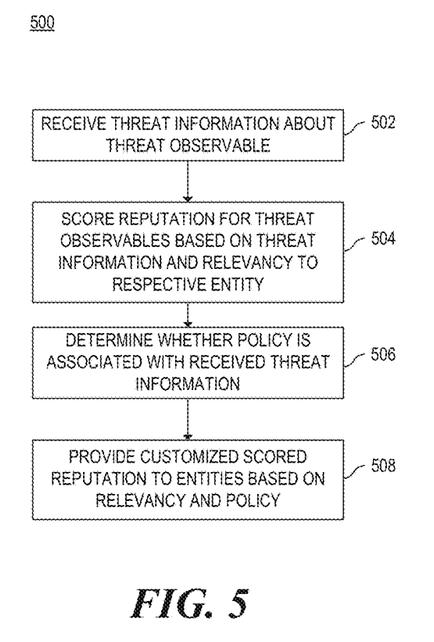
FIG. 5 is a flowchart of a method for providing a customized scored reputation of threat observables to entities based on relevancy and policy, according to one example.

FIG. 5 is a flowchart of a method for providing a customized scored reputation of threat observables to entities based on relevancy and policy, according to one example. Although execution of method 500 is described below with reference to computing device 600, other suitable components for execution of method 500 can be utilized (e.g., threat management platform 102, computing system 200, etc.). Additionally, the components for executing the method 500 may be spread among multiple devices. Method 500 may be implemented in the form of executable instructions stored on a machine-readable storage medium, such as storage medium 620 of FIG. 6, and/or in the form of electronic circuitry.

Figure 6:
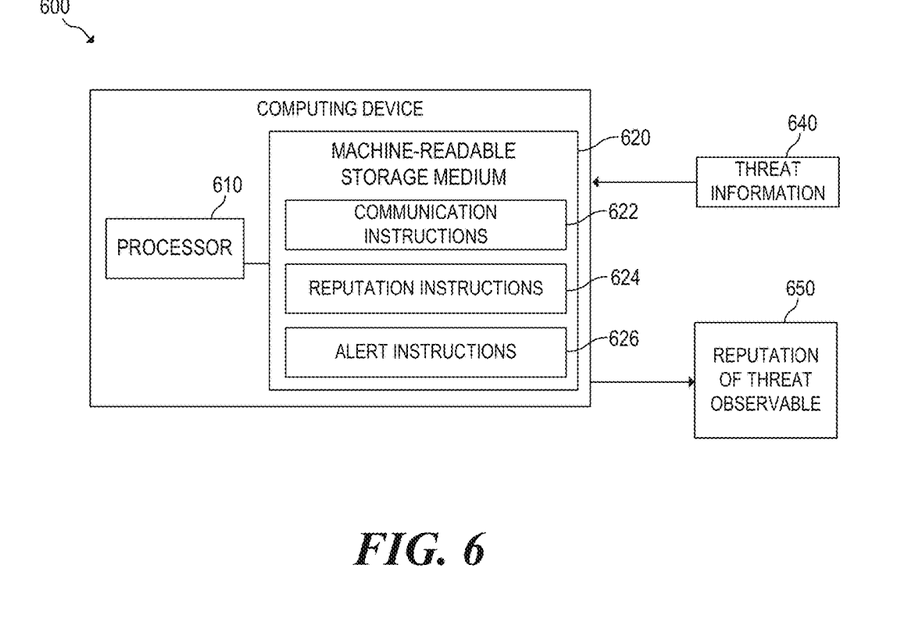
FIG. 6 is a block diagram of a computing device capable of determining reputation scores for threat observables customized for particular entities, according to one example.

At 502, the computing device 600 receives threat information 640 from a plurality of providing entities. Communication instructions 622 can be executed by processor 610 to receive and send information. The respective threat information about the threat observables respectively include at least one attribute about a respective threat associated with the threat observable. Examples of threat observables include IP addresses, domains, file hashes, etc.

Moreover, a respective policy can be associated with the respective providing entities. The policy can indicate how to distribute provided information as discussed above.

The computing device 600 can score the threats associated with threat observables (504). In one example, the scores can be in the form of reputation scores. The scores can be customized for a plurality of receiving entities. In the case of a reputation, the reputation of the threat observable 650 can be sent to the particular receiving entities. The scores associated can be calculated using different algorithms customized to its respective receiving entity and can be calculated, for example, by executing reputation instructions 624. As noted above, the score can be based on at least one attribute.

Further, the score can be based on the policy. At 506, the computing device can determine whether a policy is associated with one of the received threat information. At 508, the customized score can be provided based on relevancy, policy, and/or score levels. The customized scores can be provided as alerts, for example, by executing alert instructions 626.

For example, a score for a first entity can be determined based on 3 received pieces of information, while a score for a second entity can be determined based on 2 received pieces of information. Here, the third piece of information was not provided for the score of the second entity because of the policy. This can be used to customize the scores using the policy. As noted above, in one example, the policy rule can be determined based on respective information received from the providing entities providing the information on the threat observable. This may be what causes an alert not to be sent to the receiving entity (e.g., because not enough corroboration was determined for a threat to be present).

An example of a policy rule includes whether the receiving entity has an ability to respond to the threat observable. In one example, if the receiving entity does not have the ability to respond, the policy can keep the receiving entity from being able to use the information and/or from being able to receive an alert based on the information.

FIG. 6 is a block diagram of a computing device capable of determining reputation scores for threat observables customized for particular entities, according to one example. The computing device 600 includes, for example, a processor 610, and a machine-readable storage medium 620 including instructions 622, 624, 626. Computing device 600 may be, for example, a security appliance, a computer, a workstation, a server, a notebook computer, or any other computing device capable of providing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement methods 400 and/or 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for determining customized threat scores.

What is claimed is:

1. A non-transitory machine-readable storage medium storing instructions that upon execution cause a device to:
   receive information about a plurality of threat observables from a plurality of providing entities, wherein each respective threat observable of the threat observables includes at least one attribute about a respective threat associated with the respective threat observable;
   determine threat scores of the respective threat observables for a plurality of receiving entities that are to be alerted based on the threat scores, the determining of the threat scores comprising calculating a first score of a first threat observable of the threat observables for a first receiving entity using a first algorithm customized for the first receiving entity, and calculating a second score of the first threat observable for a second receiving entity using a different second algorithm customized for the second receiving entity, wherein the first score and the second score are different based on different treatment of the at least one attribute by the first and second algorithms in calculating the first and second scores, respectively; and
   send an alert to the first receiving entity based on the first score and a policy rule, and not send the second receiving entity the alert based on the policy rule, wherein the policy rule includes whether a receiving entity has an ability to respond to the first threat observable, and wherein the second receiving entity is not sent the alert based on a determination from the policy rule that the second receiving entity does not have the ability to respond to the first threat observable.

2. The non-transitory machine-readable storage medium of claim 1, wherein the instructions upon execution cause the device to:
   send an alert to the first receiving entity based on the first score, and not send the second receiving entity the alert based on the second score.

3. The non-transitory machine-readable storage medium of claim 2, wherein the second receiving entity is related to a group that does not include the at least one attribute, and
   wherein the different treatment of the at least one attribute by the second algorithm in calculating the second score is based on the group not including the at least one attribute.

4. The non-transitory machine-readable storage medium of claim 2, wherein the alert sent to the first receiving entity includes the first score.

5. The non-transitory machine-readable storage medium of claim 1, wherein the at least one attribute describes at least one of: an operating system, an industry type associated with an organization, a size associated with the organization, a machine type associated with the organization, and a storage type associated with the organization.

6. The non-transitory machine-readable storage medium of claim 1, wherein the instructions upon execution the device to:
   determine the policy rule based on the information received from the plurality of providing entities.

7. The non-transitory machine-readable storage medium of claim 1, wherein the first receiving entity is sent the alert based on a determination from the policy rule that the first receiving entity has the ability to respond to the first threat observable.

8. The non-transitory machine-readable storage medium of claim 1, wherein the calculating of the first and second scores is further based on a policy of a providing entity of the plurality of providing entities.

9. The non-transitory machine-readable storage medium of claim 8, wherein the policy specifies that the first score is calculated based on information provided by a first providing entity of the plurality of providing entities, and that the second score is not calculated based on the information provided by the first providing entity.

10. The non-transitory machine-readable storage medium of claim 1, wherein the different treatment of the at least one attribute by the first and second algorithms comprises using the at least one attribute in applying different weightings in calculating the first and second scores, respectively.

11. The non-transitory machine-readable storage medium of claim 1, wherein the different treatment of the at least one attribute by the first and second algorithms comprises applying different filters using the at least one attribute in calculating the first and second scores, respectively.

12. A computing system comprising:
a processor; and
a non-transitory storage medium storing instructions executable on the processor to:
receive respective threat information about a plurality of threat observables from a plurality of providing entities, wherein the threat information includes data about a respective threat associated with a respective threat observable of the plurality of threat observables;
calculate scores of the respective threat observables for a plurality of receiving entities that are to be alerted based on the scores, wherein at least a first score and a second score of the scores are determined using different algorithms customized to respective first and second receiving entities based on the respective threat information and a policy associated with a providing entity of the plurality of providing entities; and
send an alert to the first receiving entity based on the first score and the policy, and not send the second receiving entity the alert based on the policy, wherein the policy includes whether a receiving entity has an ability to respond to a first threat observable, and wherein the second receiving entity is not sent the alert based on a determination from the policy that the second receiving entity does not have the ability to respond to the first threat observable.

13. The computing system of claim 12, wherein the instructions are executable on the processor to determine to not send the alert to the second receiving entity based on the second score.

14. The computing system of claim 12,
wherein the threat information includes at least one attribute selected from among an operating system, an industry type attribute associated with an organization, a size attribute associated with the organization, a machine type attribute associated with the organization, or a storage type attribute associated with the organization, and
wherein the calculating of the first and second scores is based on relevancy of the at least one attribute to the first and second receiving entities.

15. The computing system of claim 12, wherein the threat information includes an attribute about a respective threat associated with a first threat observable of the plurality of threat observables, and wherein the instructions are executable on the processor to:
calculate a first score of the first threat observable for the first receiving entity using a first algorithm of the different algorithms; and
calculate a second, different score of the first threat observable for the second receiving entity using a second algorithm of the different algorithms, the first and second algorithms using the attribute differently in calculating the first and second scores, respectively.

16. The computing system of claim 15, wherein the different use of the attribute by the first and second algorithms comprises using the attribute in applying different weightings in calculating the first and second scores, respectively.

17. The computing system of claim 15, wherein the different use of the attribute by the first and second algorithms comprises applying different filters using the attribute in calculating the first and second scores, respectively.

18. A method comprising:
receiving, at a computing system, threat information about a plurality of threat observables from a plurality of providing entities, wherein the threat information includes an attribute about a respective threat associated with a respective threat observable of the plurality of threat observables;
calculating, by the computing system, a first threat score of a first threat observable of the plurality of threat observables using a first algorithm that uses the attribute and that is customized for a first receiving entity to be alerted based on the first threat score;
calculating, by the computing system, a second threat score of the first threat observable using a different second algorithm that uses the attribute in a manner different from the first algorithm, the second algorithm customized for a second receiving entity to be alerted based on the second threat score;
based on the first threat score and a policy rule, sending, by the computing system, an alert to the first receiving entity to cause the first receiving entity to respond to a threat associated with the first threat observable, wherein the policy rule includes whether a receiving entity has an ability to respond to the first threat observable; and
declining to send, by the computing system, the second receiving entity the alert based on the policy rule indicating that the second receiving entity does not have the ability to respond to the first threat observable.

19. The method of claim 18, further comprising:
receiving the policy rule that is based on a permission from one of the providing entities associated with the first threat observable; and
using the policy rule in the calculating of the first and second threat scores.

20. The method of claim 18, wherein the plurality of threat observables include at least one of: an internet protocol address, a domain, or a file hash.

* * * * *